INVENTORS
MEREDITH S. ULSTAD
ARTHUR E. NEUMAN
BY Bruce A. Nemer
AGENT

INVENTORS
MEREDITH S. ULSTAD
ARTHUR E. NEUMAN
BY Bruce A. Nemer
AGENT

United States Patent Office 3,441,900

Patented Apr. 29, 1969

3,441,900

SIGNAL DETECTION, IDENTIFICATION, AND COMMUNICATION SYSTEM PROVIDING GOOD NOISE DISCRIMINATION

Meredith S. Ulstad and Arthur E. Neuman, Minneapolis, Minn., assignors, by mesne assignments, to Control Data Corporation, Minneapolis, Minn., a corporation of Delaware Filed July 18, 1967, Ser. No. 654,270
Int. Cl. H04b 13/00
U.S. Cl. 340—5 7 Claims

ABSTRACT OF THE DISCLOSURE

A sonar system providing good noise discrimination is disclosed. The input to the system is formed by suitable transducers which divide the space under investigation into several beams. The system then compares the signals and noise of adjacent beams and provides an output indicating the power density spectrum of the difference found. Since the noise power density spectrum is equal in both beams, the noise effect is cancelled by the comparison.

The various power density spectra found may then be processed to determine the identities of their probable sources.

A method for communicating using transmitted signals approximating a series of normally occurring ocean signals in a prearranged pattern is also disclosed.

*Background*

Prior sonar systems investigated underwater environments by receiving a signal, detecting the information in the signal, and interpreting the detected signal. Noise is a severe and inherent problem in systems of this kind because noise is detected along with a desired signal. In a high noise environment, a desired signal may be lost. Even in a relatively low noise environment, noise makes signal interpretation difficult.

The present invention operates by comparing the signals and noise in adjacent beams formed by a beam forming array of transducers and indicating the power density spectrum of the difference. By subtracting the signals and noise from adjacent beams, the effect of the noise is suppressed because the power density spectrum of the noise in adjacent beams is substantially similar. The power density spectrum of a desired signal, which remains, is then identified by a comparison to known power density spectra.

Some prior art systems used power density spectrum analysis for identification; but, the systems were still limited by noise considerations. Also, without using the techniques of the present invention, prior art sonar systems could not detect small signal differences in noise between any two beams without exactly matching the gain of every amplifier, the band width of every filter, and the time constant of every integrator in each signal path. The present invention eliminates the need for this matching.

*Description*

It is an object of this invention to advance the art of signal detection in the presence of noise where the environment to be investigated is divided into discrete sectors by an informational receiving means.

It is a further object of this invention to provide a method of communicating by generating a signal having normal environmental characteristics to a prior art system but having a preassigned meaning to a system using the teachings of the present invention.

It is an additional object of the present invention to provide a method of investigating an environment which identifies the nature of objects within the environment and indicates the probability that the identification is correct.

Further objects and advantages may be ascertained from an understanding of the description of the illustrative embodiment of the invention and from the appended claims.

The illustrative embodiment may best be described by reference to the accompanying drawings where:

Figure 1:
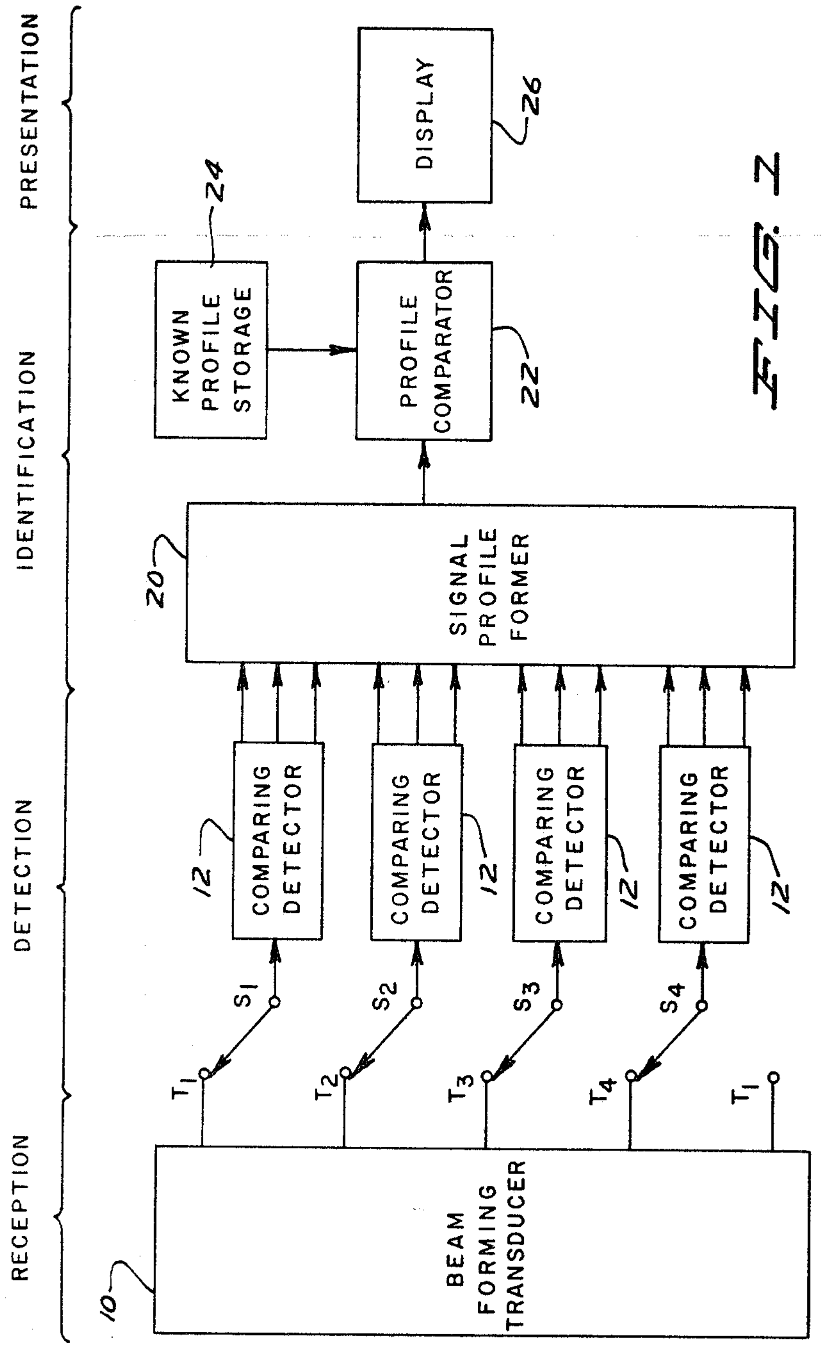
FIGURE 1 shows the block diagram of a preferred embodiment of a sonar system using the teachings of the present invention.

In FIGURE 1, a beam forming transducer system or information receiving means 10 is shown providing outputs T1, T2, T3, and T4. Each output represents the transducer signal from one beam or sector of the environment. A series of switches, S1 through S4, have a first condition for providing a connection to one sector and a second condition for providing a connection to an adjacent sector. In the first condition, S1 through S4 are connected to T1 through T4 respectively. In the second condition, S1 through S4 are connected to T2, T3, T4, and T1 respectively. S1 through S4 are also permanently connected to four comparing detectors 12 each of which are in turn connected to a summing means or signal profile former 20. The output of signal profile former 20 is connected to a profile comparator 22. Another input to profile comparator 22 is provided by a known profile storage 24. Profile comparator 22 provides inputs to a display or indication means 26.

Figure 2:
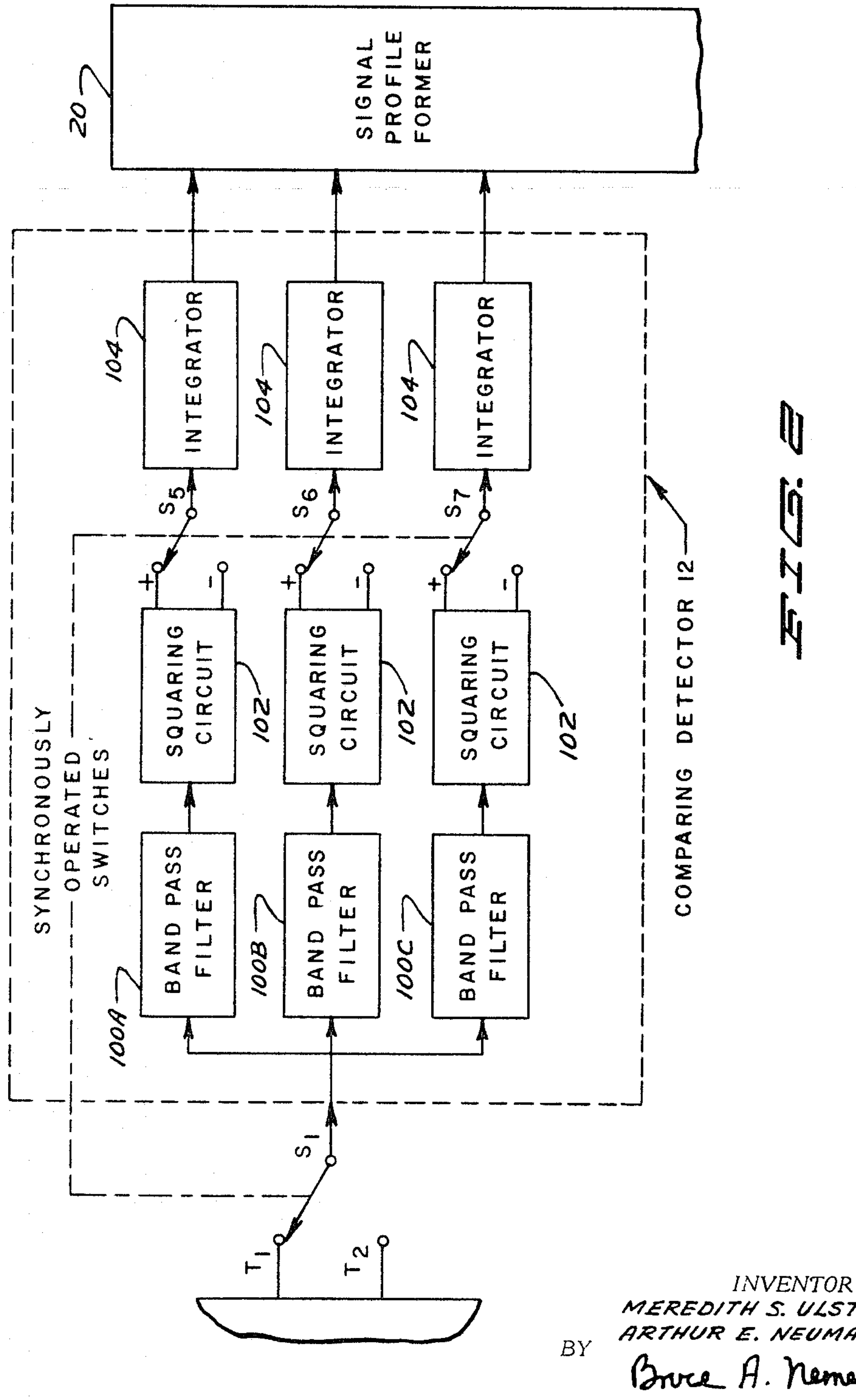
FIGURE 2 shows a preferred embodiment of a block diagram expansion of a block within FIGURE 1.

FIGURE 2 shows an expansion of comparing detector 12. S1 is shown connecting T1 to three parallel band pass filters or frequency dividing means 100A, B, and C which are in turn connected to three squaring means or energy detecting means 102. Three separate frequency bands are passed by hand pass filters A, B, and C. Each squaring means has a positive and a negative output. Additional switch means S5, S6, and S7 are shown providing connections between the three squaring means 102 and three integrating means 104. All switches are synchronously operated. So, when S1 is in the first condition contacting T1 as shown, S5 through S7 connect the positive outputs of their respective squaring circuits to individual integrating means 104. When S1 is in the second condition contacting T2, S5 through S7 connect the negative outputs of their respective squaring circuits to individual integrating means 104. Integrators 104 provide the output from comparing detector 12 and are connected to signal profile former 20, as in FIGURE 1.

*Operation*

FIGURES 1 and 2 are descriptive of the basic invention and are used for ease of explanation. A preferred embodiment of this invention includes a greater number of beams, switches, and comparing detectors. Also, a preferred embodiment of a comparing detector includes a greater number of filters, squaring circuits, and integrators. The design criteria in choosing a preferred number will be discussed.

The embodiment shown in FIGURE 1 assumes transducer 10 is operating in a medium such as the ocean. Assuming no localized noise sources, the noise content of all beams formed by transducer 10 will be equal. Thus the signal supplied to comparing detector 12 when the switches are in the first condition is equal to the signal supplied to comparing detector 12 when the switches are in the second condition. Since comparing detector 12 provides an output only when signals differ during the first and second condition of the switch, no signal is provided by comparing detector 12 under the assumption of no localized noise sources. Therefore, the profile former has no output; the profile comparator can make no comparison; and no display is seen.

Now assume the presence of a localized noise source within the environment, for example a ship. Also assume the transducers are placed circularly to scan 360° around the investigating device. Since signals from the ship will not be within all of the beams, the signal received by two of the beams will be unequal. Further assuming the signal difference is between T1 and T2 and referring to FIGURE 2, the signal received from T1 is passed through three band pass filters 100 and to three squaring circuits 102. During the first condition of the switches, each integrator receives a signal indicating the positive result of the processed signal from T1. When the switches are in the second condition, each integrator receives a signal indicating the negative result of the processed signal from T2. It is seen that, if the signals are equal, the integrator will provide no net output. But, since there is a difference between the signals at T1 and T2 due to the presence of the ship, integrators 104 provide a signal output indicating the differential signal strength within their associated frequency bands.

The output signals from all integrators 104 are applied to signal profile former 20. Signal profile former 20 is in the manner of a summer; it forms a composite signal indicating the spectrum or profile of all signals received. This spectrum is applied to profile comparator 22. Profile comparator 22 compares the profile or spectrum found with known profiles or spectra within known profile storage 24. An output is provided to display 26 which indicates the closest match between a profile found and known profiles. In the event that a sequence of profiles found conforms to a preassigned code, display 26 provides an output message.

Beam forming transducer system 10 of FIGURE 1 may be any information receiving means or transducer which divides the environment into a plurality of sectors. This may be achieved by an array of transducers each providing an individual beam, or it may be achieved through the use of a phased array of transducers so that beams are electronically formed. The only requirement is the formation of beams.

It will be obvious that four beams will inadequately define most objects appearing radially from transducer 10 since each beam would then cover 90°. It would be difficult to distinguish between two objects within a beam or to allow for all combinations of objects within a beam. It is therefore seen that the number of beams will depend on the definition required by the system. A number near 60, or a beam width near six degrees, is thought practically sufficient.

Comparing detector 12 shown in FIGURE 2 is a type of spectrum analyzer, if switches S5 through S7 are removed and only one polarity of output is provided. The design of comparing detector 12 will be obvious to one skilled in the art of designing spectrum analyzers. Output stages, one of which is inverting, supply the positive and negative polarities required. Three parallel signal processing paths are shown. The actual number desired will depend upon the frequency band desired to be covered and the definition or number of special lines required. The finer the definition, the more bands necessary. The broader the band width to be covered, the more bands necessary for a given definition. An investigation of a 1000 cycles per second band of frequencies using 20 cycle per second bandwidths has experimentally yielded satisfactory identification results. It is not necessary that any of the bands be of equal bandwidth, be equally spaced or even be related to one another. Assuming a desired bandwidth arrangement, provision may be made for the arrangement in profile comparator 22. A theoretical analysis of a circuit similar to comparing detector 12 is provided by David Middleton in his book, An Introduction to Statistical Communication Theory, published by McGraw-Hill in 1960. Specifically, refer to Section 5.2–3 entitled "A Simple Spectrum Analyzer."

Signal profile former 20 accepts the outputs of all integrators 104 from all comparing detectors and forms them into power density spectra of the incoming signals. Since the direction of the object in the environment is desired, signal profile former 20 will maintain the source identity of the outputs from each comparing detector 12. The polarities of the signals from each comparing detector 12 indicate which of the two beams predominated. In effect, signal profile former 20 sums the individual frequency band outputs from each comparing detector 12 into individual power density spectra. Signal profile former 20 may also play the role of traffic controller; it may be needed to sequence the four power density spectra comprising the outputs from the four comparing detectors so that profile comparator 22 does not receive two spectra at once.

The design of profile comparator 22 determines the role of signal profile former 20. If profile comparator 22 can accept all spectra simultaneously, no traffic function is needed. The design of profile comparator 22 may provide for a priority system and relegate signal profile former 20 solely to its summing role. Profile comparator 22 may be comprised of any means for comparing signals—for example differential amplifiers, magnetic comparators, cams, electronic logic circuitry, or any other comparing mechanisms.

The preferred embodiment of signal profile former 20, profile comparator 22, and known profile storage 24 is an appropriately programmed digital computer where: the computer memory performs the function of known profile storage 24; a digital to analog encoder performs the function of profile former 20; and logic circuitry performs the function of comparator 22. The analog information contained in the power density spectrum from each comparing detector 12 is first converted to a digital format by the analog to digital encoder. Next, each spectrum is logically compared to all spectra stored in the computer memory, and the stored spectrum providing the closest match of spectra characteristics with the incoming spectrum is gated to display 26.

The use of a digital computer allows the presentation of a unique type of display where the probability of a correct identification of an incoming signal is presented along with that identification. The computer is well suited for this type of output because the exact number of common characteristics may be counted during the comparison. If all of the characteristics of an incoming spectrum are found in memory, the probability of a correct identification is one. If, however, a lesser number of common characteristics are found, the computer can compute the probability that the identification is correct. Thus, information and its competence level may be provided by display 26.

The additional advantage of coded communication between systems using the teachings of the present invention is possible with a digital computer. If one system transmits a signal simulating a time varying, pseudorandom combination of marine noise sources on a predetermined basis, the computer can decode this signal in the same manner as it identifies the identity of noise sources. That is, incoming signals are continuously matched with stored predetermined patterns. When a match has been determined, the computer provides an output indicating the information in the code. The range and complexity of the coded signals is limited only by the storage and computing capacity which can be allotted. Since a standard sonar receiver would interpret the incoming signals as normally occurring ocean noises, communication can be carried on without the knowledge of a nonuser of the present invention.

Various other types of displays are also possible. In one type the power density spectra is directly displayed for operator interpretation, for example, a circular display showing the power density spectra in a given direction with the strength of each component modulating the light intensity. A similar three dimensional display may be desired.

As indicated in FIGURE 1, the embodiment shown may be divided into the parts of reception, detection, identification, and presentation. The transducer system provides reception; detection is performed by circuitry analogous to a spectrum analyzer with the addition of appropriately placed switches S1 through S7; identification is performed by a digital computer; and presentation may be performed by many types of apparatus.

It will be obvious to those skilled in the art that many variations may be made within the teachings of the present invention. For example, many types of transducers may be used; various embodiments of comparing detector 12 will properly provide detection; many different programs and many different computers will properly perform the identification function; and many displays may be used depending upon the type of information desired.

Also, switches S1 through S7 may be physical switching elements or electronic switches.

Additionally, the system is not limited to an underwater application. While the discussion referred to an underwater environment, no restriction on the environment is intended.

Further, application is not limited to a particular medium. The only requirement for identification is: background noise, from whatever source, must appear equally in adjacent beams. Objects may be detected in a very noisy, directional environment if the noise appears equally in adjacent beams.

Furthermore, signal characteristics other than power density spectra may be detected and yet remain within the teachings of the present invention. No limitation to one signal characteristic is intended.

Similarly, a digital computer or computing device may be suitably programmed to perform part of the function of the comparing detectors 12 also. For example, computers can perform the function of integrators 104.

Likewise, storage means other than a computer memory may be used. For example reels of magnetic tape, magnetically coded discs, punched cards, and other storage means are possible.

Power supplies not shown may be necessary to provide power to some of the circuitry in the blocks.

The description of the present invention is for illustrative purposes only and is not intended as a limitation. Many alternates and variations will be obvious to one skilled in the art. It is desired that the present invention be limited only by the appended claims in which it is intended to cover the full scope and spirit of the present invention.

What is claimed is:

1. Apparatus for investigating an environment comprising:

(a) a transducer for dividing the environment into a plurality of sectors and for providing signals from the various sectors;

(b) switch means connected to the transducer for providing a plurality of outputs, each output having a first condition for providing signals from one sector and a second condition for providing signals from an adjacent sector;

(c) means for repetitively changing the switch means from the first to the second condition;

(d) means connected to each output of the switch means for dividing each output into a plurality of discrete frequency bands;

(e) detector means connected to each means (d) for comparing the frequency information present when the switch means is in the first condition with the frequency information present when the switch means is in the second condition and for providing an output indicative of any difference.

2. The apparatus of claim 1 wherein the detector means further comprises:

(aa) means for squaring attached to each means (d), each squaring means having a positive and negative output;

(bb) a plurality of integrating means;

(cc) additional switch means for connecting one integrating means to the positive output of each squaring means when switch means (b) is in the first condition and for connecting the same integrating means to the negative output of the same squaring means when switch means (b) is in the second condition.

3. The apparatus of claim 1, further comprising:

(f) summing means connected to all detector means for forming sector frequency profiles; and (g) profile comparison means for comparing the frequency profiles obtained from the summing means against known frequency profiles for determining the identification of objects within the environment.

4. The apparatus of claim 3 also including:

(h) indication means for indicating the results of the profile comparison as possible identifications and the probability of correctness attached to each possible identification depending upon the degree of matching of the unknown frequency profile with known frequency profiles.

5. The apparatus of claim 4 wherein the summing means, the profile comparison means, and the indication means are comprised by a digital computer.

6. The apparatus of claim 3 also including:

(h) indication means for indicating when the results of a sequence of profile comparisons conforms to a known code and for indicating the message contained in that code.

7. The apparatus of claim 6 wherein the summing means, the profile comparison means, and the indication means are comprised by a digital computer.

References Cited

UNITED STATES PATENTS

| | | | |
|---|---|---|---|
| 2,368,953 | 2/1945 | Walsh | 340—6 X |
| 2,539,402 | 1/1951 | Clark | 343—120 |
| 2,561,366 | 7/1951 | Hart | 340—6 |
| 2,659,082 | 11/1953 | Pearson | 343—120 |
| 3,229,287 | 1/1966 | Hovda | 343—120 X |

RICHARD A. FARLEY, *Primary Examiner.*

U.S. Cl. X.R.

340—6; 343—120